A. BERNARDI.
STAGE SCENERY FOR THEATERS.
APPLICATION FILED JULY 18, 1908.

919,308.

Patented Apr. 27, 1909.
2 SHEETS—SHEET 1.

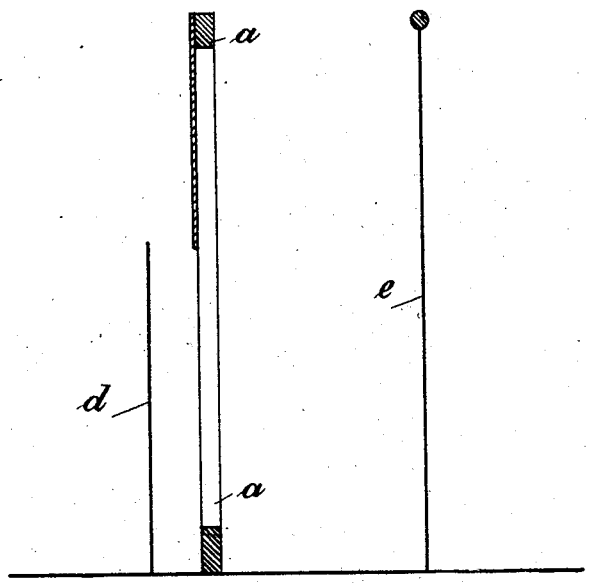

UNITED STATES PATENT OFFICE.

ARTURO BERNARDI, OF LONDON, ENGLAND.

STAGE-SCENERY FOR THEATERS.

No. 919,308.  Specification of Letters Patent.  Patented April 27, 1909.

Application filed July 18, 1908. Serial No. 444,218.

*To all whom it may concern:*

Be it known that I, ARTURO BERNARDI, a subject of the King of Italy, and resident of London, England, have invented Improvements in Stage-Scenery for Theaters, of which the following is a specification.

The purpose of the present invention is to provide stage-scenery which will enable the audience, under certain circumstances, to view acts taking place behind the scenes, for example the changing of dress by a so-called quick-change artist, and which also enables the stage behind the scenes to be hidden from the view of the audience if desired.

In its general construction, the scenery is similar to that heretofore used, comprising for example, three frames or frame parts, with edges abutting together to form two obtuse angles at the junctions between the central and lateral parts. The upper portions of this composite frame are covered with canvas or the like, painted in the usual manner, to represent, for example, part of the interior of a room. The lower portions, generally to the height of about six feet or more, are only covered with thin, transparent fabric or the like when acts behind the scenes are to be visible to the audience, but when the stage behind the scenes is to be concealed, this transparent material is covered with opaque fabric painted to form a continuation of the scenery represented on the upper portion of the frame. The opaque covering of the lower part of the frame can be removed and replaced at will.

In order that the invention may be clearly understood, reference is made to the annexed drawing, in which:—

Figure 1:
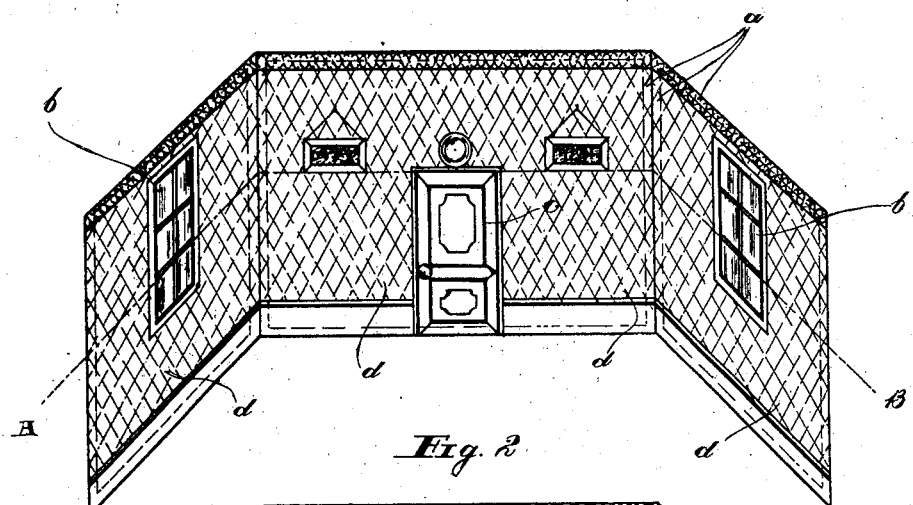
Figure 2:
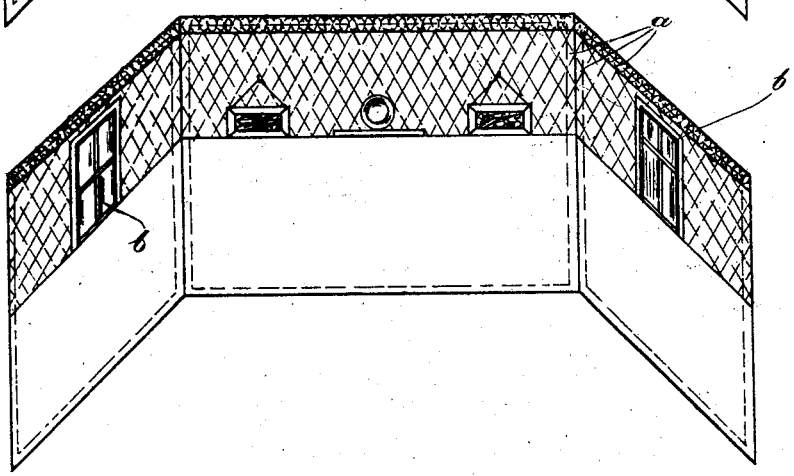

Figure 1 is a part of a scenery which is not transparent for the audience. Fig. 2, a scenery, a portion of which is transparent. Fig. 3 is a cross section with the cover $d$ partially removed.

Referring to the drawing, $a$ is the frame or skeleton of a scenery which is covered in a manner to represent the interior of a room. The upper portion of the frame above the line A—B is covered by an opaque painted canvas or the like upon which are painted representations of pictures and the upper portions of the windows $b$—$b$. Below the line A—B the frame is covered with transparent fabric or the like over which a painted canvas $d$ can be attached portraying the lower portions of windows $b$—$b$ and the door $c$ thus completing the representation of a room. All the portions below the line A—B can be made transparent by removing the insertions $d$, when the audience can see all movements and actions of the performer. When the scenery is thus made transparent, a curtain of any color is hung up behind the scenery, so that the back of the stage is hidden from the eyes of the audience. A suitable light is provided from the top of the stage.

Having fully described my invention, what I claim and desire to secure by Letters Patent is:—

In a scenery for quick change artists, a frame, a transparent covering on the lower portion of said frame, an opaque covering on the upper portion of said frame having thereon a representation of the upper portion of the walls of a room, an opaque covering adapted to be placed on the lower portion of the frame over said transparent covering and having thereon, a representation completing the walls of the room, and a curtain hung behind said frame.

In testimony whereof I have hereunto set my hand in the presence of two subscribing witnesses.

ARTURO BERNARDI.

Witnesses:
HENRY O. KLAUSER,
D. MATCHNON.